United States Patent
Zeng et al.

(10) Patent No.: US 8,433,009 B2
(45) Date of Patent: Apr. 30, 2013

(54) METHOD FOR DETERMINING AS TO WHETHER A RECEIVED SIGNAL INCLUDES A DATA SIGNAL

(75) Inventors: Yonghong Zeng, Singapore (SG); Choo Leng Koh, Singapore (SG); Ying-Chang Liang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 609 days.

(21) Appl. No.: 12/600,164

(22) PCT Filed: May 7, 2008

(86) PCT No.: PCT/SG2008/000171
§ 371 (c)(1),
(2), (4) Date: Nov. 13, 2009

(87) PCT Pub. No.: WO2008/140417
PCT Pub. Date: Nov. 20, 2008

(65) Prior Publication Data
US 2011/0249776 A1    Oct. 13, 2011

Related U.S. Application Data

(60) Provisional application No. 60/917,770, filed on May 14, 2007.

(51) Int. Cl.
*H04B 1/00*    (2006.01)
(52) U.S. Cl.
USPC .......................................... 375/343; 375/130

(58) Field of Classification Search ............. 375/343, 375/130, 136, 147, 150, 316; 455/450, 451; 370/203, 329
See application file for complete search history.

(56) References Cited

U.S. PATENT DOCUMENTS

| | | | |
|---|---|---|---|
| 5,455,846 A | 10/1995 | Gardner | |
| 5,822,368 A | 10/1998 | Wang | |
| 5,828,954 A | 10/1998 | Wang | |
| 6,430,239 B1 | 8/2002 | Ferreol | |
| 2002/0188444 A1 | 12/2002 | Menendez-Pidal et al. | |
| 2003/0169202 A1 | 9/2003 | Krikorian et al. | |
| 2004/0161046 A1* | 8/2004 | Schott et al. | 375/260 |
| 2004/0181396 A1 | 9/2004 | Lee et al. | |
| 2004/0223554 A1 | 11/2004 | Cha | |

(Continued)

FOREIGN PATENT DOCUMENTS
WO    00/65729 A1    11/2000

OTHER PUBLICATIONS

Gardner, W., et al., "Cyclostationarity: Half a Century of Research," Signal Processing, vol. 86, Issue 4, Elsevier North-Holland, Amsterdam, 2006, pp. 639-697.

(Continued)

*Primary Examiner* — Khai Tran
(74) *Attorney, Agent, or Firm* — Fliesler Meyer LLP (57) ABSTRACT

A method of determining as to whether a received signal includes a data signal is provided. The method provided includes determining a first value based on a cyclic auto-correlation of the received signal and determining a second value based on the cyclic auto-correlation of the received signal. The method provided further includes determining as to whether a received signal includes a data signal based on a comparison of the first value and the second value.

26 Claims, 6 Drawing Sheets

U.S. PATENT DOCUMENTS

2005/0217461 A1 10/2005 Wang
2006/0209746 A1* 9/2006 Asai et al. ................ 370/328
2007/0100922 A1 5/2007 Ashish

OTHER PUBLICATIONS

Gardner, W., "Exploitation of Spectral Redundancy in Cyclostationary Signals," IEEE Signal Processing, vol. 8, Apr. 1991, pp. 14-36.

Paliwal, K.K., et al., "Cyclic Autocorrelation-based Linear Prediction Analysis of Speech," Proceedings of the 5th European Conference on Speech Communication and Technology (Eurospeech 97), Rhodes, Greece, Sep. 1997, pp. 279-282.

International Search Report, in connection with PCT/SG2008/000171, mailed Sep. 2, 2008, 3 pages.

* cited by examiner

METHOD FOR DETERMINING AS TO WHETHER A RECEIVED SIGNAL INCLUDES A DATA SIGNAL

The present application claims the benefit of U.S. provisional application 60/917,770 (filed on 14 May, 2007), the entire contents of which are incorporated herein by reference for all purposes.

FIELD OF THE INVENTION

Embodiments of the invention relate to the field of communications. By way of example, embodiments of the invention relate to a method of determining as to whether a received signal includes a data signal as well as a corresponding determining unit, an electronic device comprising the said corresponding determining unit and a corresponding computer program product.

BACKGROUND OF THE INVENTION

The uniqueness in the operation of a cognitive radio is that a cognitive radio is able to sense the spectral environment over a wide frequency band and exploit this information to provide wireless links that best meet a user's communications requirements. In this context, the cognitive radio does not have primary access rights to the frequency band used. As such, it is necessary that the cognitive radio is able to dynamically detect the presence of the signals transmitted by the primary users, so that it can avoid transmitting signals in the frequency channels used by the primary users. In this regard, the primary user may be considered as devices or services which have been given the primary access rights to the said frequency band(s).

A commonly used method for sensing or detecting the presence of signals transmitted by the primary users is the cyclo-stationary based detection methods. In this context, the term cyclo-stationary refers to a property of the received signal (such as the cyclic auto-correlation or the spectral correlation density (SCD), for example), which has statistical properties that vary in time with one or more periodicities.

It is known that in order to achieve perfect cyclic auto-correlation for conventional cyclo-stationary based detection methods, an infinite number of samples of the received signal are required. However, in practice, the sampling time is a finite and limited value. As such, it is possible to obtain only a finite number of samples of the received signal. Therefore, it may be difficult to achieve perfect cyclic auto-correlation in practice. In view of the above, the performance of the conventional cyclo-stationary based detection methods may be degraded.

Further, the conventional cyclo-stationary based detection methods rely on an accurate knowledge of noise power in order to set their respective threshold values. However, in practice, it may be difficult to obtain accurate knowledge of noise power due to noise uncertainty. There are several sources of noise uncertainty, namely: (1) non-linearity properties of the components used; (2) thermal noise in the components used (which may be non-uniform and time-varying, for example); (3) noise due to transmissions by other users (for example, unintentional users who may be nearby or intentional users who may be far away). As such, the conventional cyclo-stationary based detection methods may also be vulnerable to noise uncertainty.

SUMMARY OF THE INVENTION

In one embodiment of the invention, a method of determining as to whether a received signal includes a data signal is provided. The method provided includes determining a first value based on a cyclic auto-correlation of the received signal and determining a second value based on the cyclic auto-correlation of the received signal. The method provided further includes determining as to whether a received signal includes a data signal based on a comparison of the first value and the second value.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION OF THE INVENTION

As mentioned earlier, the disadvantages of the cyclo-stationary based detection method include the requirement of an infinite amount of samples of the received signal and the reliance on an accurate knowledge of noise power in order to set its threshold. These disadvantages compromises the reliability of the process of sensing or detecting the presence of signals transmitted by the primary users carried out using the cyclo-stationary based detection method.

The above mentioned disadvantages may be overcome, for example, as follows. According to embodiments of the invention, the cyclic auto-correlation property of the received signal may be incorporated into the cyclo-stationary based detection method. Using the cyclic auto-correlation property, two test statistics may be first calculated.

In the case when the received signal does not include a data signal, the two test statistics are equal; otherwise, the two test statistics are different. As such, the ratio of the two test statistics may be used, for example, in order to determine as to whether the received signal includes the data signal.

According to one embodiment of the invention, a method of determining as to whether a received signal includes a data signal is provided. The method provided includes determining a first value based on a cyclic auto-correlation of the received signal and determining a second value based on the cyclic auto-correlation of the received signal. The method provided further includes determining as to whether a received signal includes a data signal based on a comparison of the first value and the second value.

According to one embodiment of the invention, a system for determining as to whether a received signal includes a data signal is provided. The system provided includes a first determining unit configured to determine a first value based on a cyclic auto-correlation of the received signal, and a second determining unit configured to determine a second value based on the cyclic auto-correlation of the received signal. The system provided further includes a third determining unit configured to determine as to whether a received signal includes a data signal based on a comparison of the first value and the second value.

According to one embodiment of the invention, an electronic device is provided. The electronic device provided includes the system described earlier.

According to one embodiment of the invention, a computer program product is provided. The computer program product provided, makes, when being executed by a computer, the computer perform a method for determining as to whether a received signal includes an information signal, which includes determining a first value based on a cyclic auto-correlation of the received signal, determining a second value based on the cyclic auto-correlation of the received signal, and determining as to whether a received signal includes a data signal based on a comparison of the first value and the second value.

Embodiments of the invention emerge from the dependent claims.

In one embodiment, it is determined that the received signal includes a data signal if the second value is larger than the first value multiplied with a predetermined factor. In another embodiment, it is determined that the received signal does not include a data signal if the second value is smaller than or equal to the first value multiplied with the predetermined factor.

In one embodiment, the predetermined factor is determined based on a predetermined number of samples of the received signal. In another embodiment, the predetermined factor is determined based on a predetermined probability of false alarm. In yet another embodiment, the predetermined factor is determined based on the determination of the probability of the second value being greater than the first value multiplied with the predetermined factor in the case that the received signal does not include a data signal as the probability of false alarm.

In one embodiment, the method further includes filtering the received signal. In another embodiment, the method further includes sampling the received signal. In yet another embodiment, the method further includes filtering the sampled received signal.

In one embodiment, the first value includes the cyclic auto-correlation value corresponding to the cyclic frequency of zero. In another embodiment, the first value is the cyclic auto-correlation value corresponding to the cyclic frequency of zero.

In one embodiment, the second value includes the cyclic auto-correlation values corresponding to a plurality of predetermined cyclic frequencies. In another embodiment, the second value is given by the sum of the cyclic auto-correlation values corresponding to the cyclic frequencies of the plurality of predetermined cyclic frequencies.

In one embodiment, the determining of the first value and/or the second value includes determining an average value of a cyclic auto-correlation of the received signal. In another embodiment, the determining of the first value and/or the second value includes determining a maximum value of the cyclic auto-correlation of the received signal.

In one embodiment, the determining of the first value and/or the second value includes determining an average value of a spectral correlation density of the received signal. In another embodiment, the determining of the first value and/or the second value includes determining a maximum value of the spectral correlation density of the received signal.

In one embodiment, the determining unit provided further includes a filter for filtering the received signal. In another embodiment, the determining unit provided further includes a sampling unit for sampling the received signal. In yet another embodiment, the determining unit provided further includes a filter for filtering the sampled received signal.

In one embodiment, the electronic device is a sensing wireless device. In another embodiment, the electronic device is a sensing wireless microphone.

In one embodiment, the electronic device is configured as a communication device selected from a group of communication devices consisting of a communication terminal, and a medium player device configured to play at least one medium.

In one embodiment, the electronic device further includes a receiver to receive a signal.

The embodiments which are described in the context of the method of determining as to whether a received signal includes a data signal provided are analogously valid for the determining unit, the electronic device and the computer program product, and vice versa.

Figure 1:
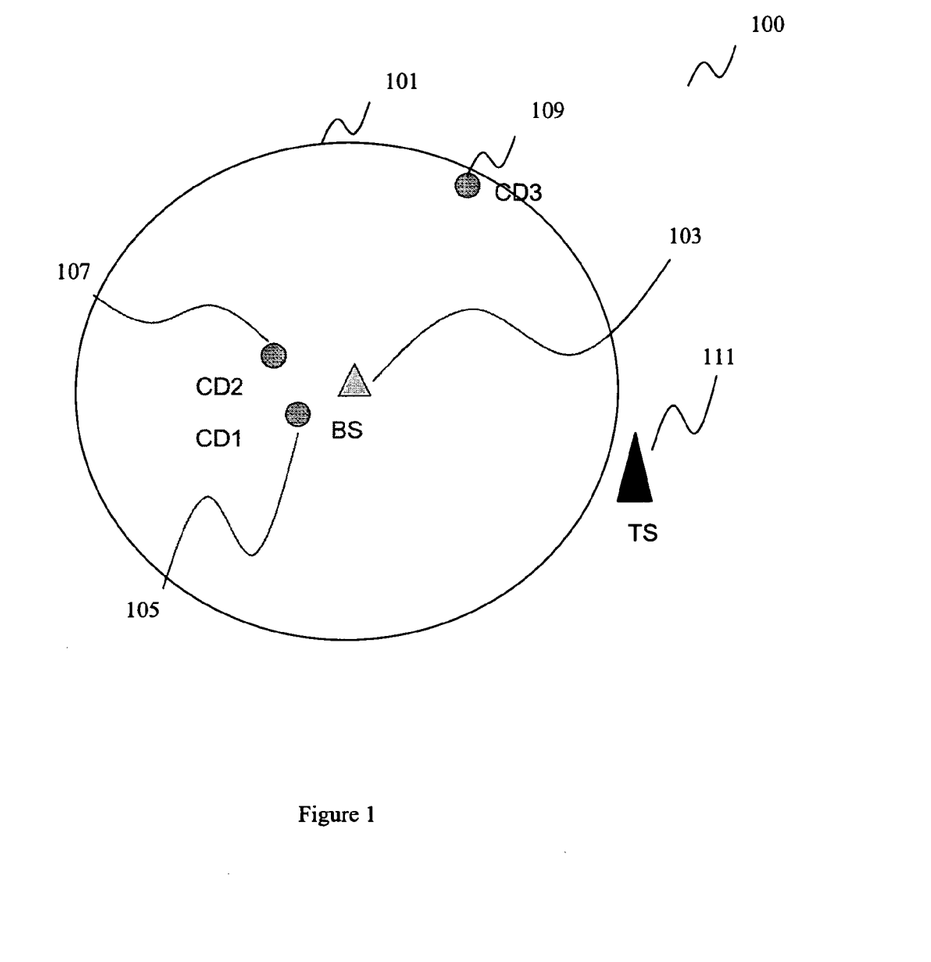
FIG. 1 shows a communication system in which a method of determining as to whether a received signal includes a data signal according to one embodiment of the invention may be used.

FIG. 1 shows a communication system 100 in which the method of determining as to whether a received signal includes a data signal according to one embodiment of the invention may be used.

The communication system 100 includes a communication system cell 101, in which a base station (BS) 103, a first communication device (CD1) 105, a second first communication device (CD2) 107 and a third first communication device (CD3) 109 are located.

The communication system 100 may operate based on the concept of cognitive radio. As such, the data transmission of the communication system cell 101 may use only the frequency ranges not used by a television (TV) transmission station (TS) 111, which is located near the communication cell 101.

As a side remark, it should be noted that the TV transmission station (TS) 111 is not part of the communication system 100. Instead, the TV transmission station (TS) 111 may be considered as a primary user, since a portion of the frequency range of interest to the communication system 100 has been assigned for dedicated use by the TV transmission station (TS) 111. In this case, the data signal discussed earlier may refer to the TV transmission (or broadcast) signal.

For example, the communication system 100 may represent the proposed IEEE 802.22 wireless regional area network (WRAN). The proposed IEEE 802.22 WRAN operates in the very high frequency (VHF) and the ultra high frequency (UHF) frequency band (between 47 MHz and 910 MHz), which have already been allocated for the use of TV broadcast and Part 74 wireless microphone devices, for example.

In order to avoid causing interference to TV broadcast signals and to Part 74 devices, WRAN devices, such as base stations (BS) and customer premise equipments (CPE) (for example, CD1 105, CD2 107 and CD3 109), may perform a detection of data signals transmitted by primary users, while determining the availability of the frequency ranges in which they are operating. As such, embodiments of the method of determining as to whether a received signal includes a data signal provided by the present invention may be used for this purpose.

Figure 2:
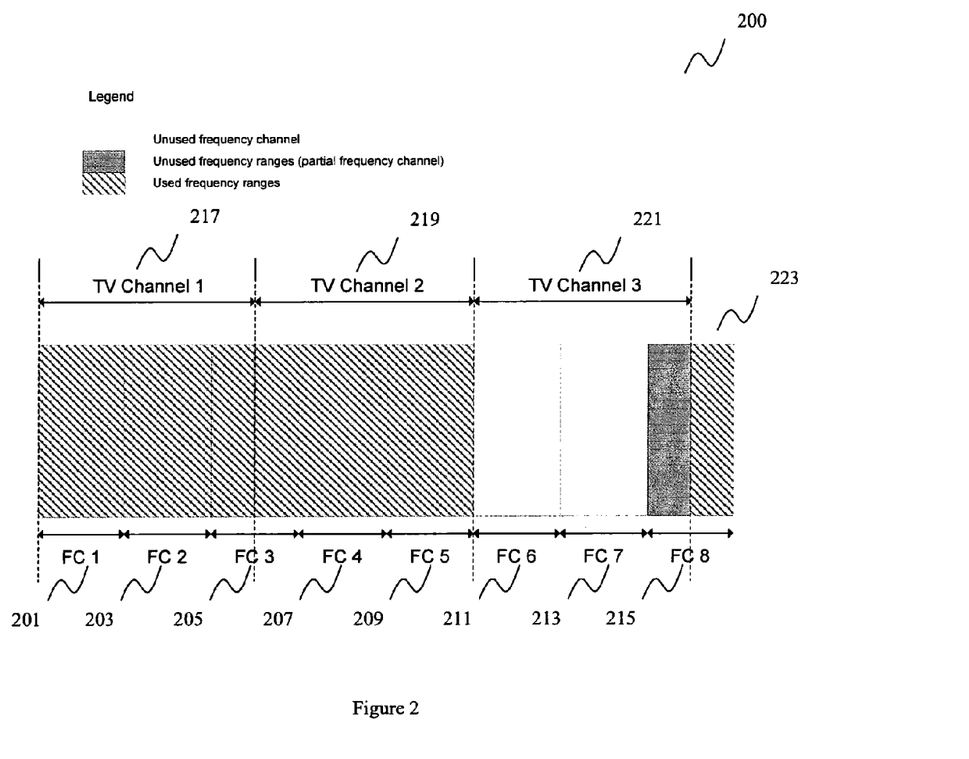
FIG. 2 shows an illustration of how frequency ranges may be used by the communication system shown in FIG. 1 according to one embodiment of the invention.

FIG. 2 shows an illustration of how frequency ranges may be used by the communication system 100 shown in FIG. 1 according to one embodiment of the invention.

In this illustration, it is assumed that the entire frequency range 200 may be of interest to the said communication system. The communication system 100 may then assign a selected portion of the frequency range to a logical frequency channel, for example, the first logical frequency channel (FC 1) 201, the second logical frequency channel (FC 2) 203, the third logical frequency channel (FC 3) 205, the fourth logical frequency channel (FC 4) 207, the fifth logical frequency channel (FC 5) 209, the sixth logical frequency channel (FC 6) 211, the seventh logical frequency channel (FC 7) 213 and the eighth logical frequency channel (FC 8) 215.

As with any cognitive radio, in order to determine whether there are available (or unused) frequency channels, the communication system 100 may then periodically perform the process of sensing (or determining whether there are signal transmissions by primary users) in the respective frequency channels in the entire frequency range of interest. For example, the communication system 100 may perform the process of sensing on one logical frequency channel at a time, from the first frequency channel (FC 1) 201 to the eighth frequency channel (FC 8) 215. In this context, the process of sensing may be performed using the embodiments of the method of determining as to whether a received signal includes a data signal provided by the present invention.

As a side note, as shown in FIG. 2, the communication system 100 may discover, as a result of the process of sensing performed, that only the sixth logical channel (FC 6) 211 and the seventh logical channel (FC 7) 213 may be unused, and may thus be available for the communication system 100 to use in communication or data transmission.

Further, it can also be seen from FIG. 2 that the other logical frequency channels may be occupied (or used) due to the TV signal transmissions on TV Channel 1 (217) and TV Channel 2 (219) (for example, by the television transmission station (TS) 111), and an unknown primary user (223).

Additionally, it can be seen that there is no signal transmission on TV Channel 3 (221) at the point in time when the process of sensing was performed, even though that portion of frequency range had already been allocated for TV Channel 3 (221). This may be because TV Channel 3 (221) is not broadcast to the said area or the said time is not within the operating hours of TV Channel 3 (221).

Figure 3:
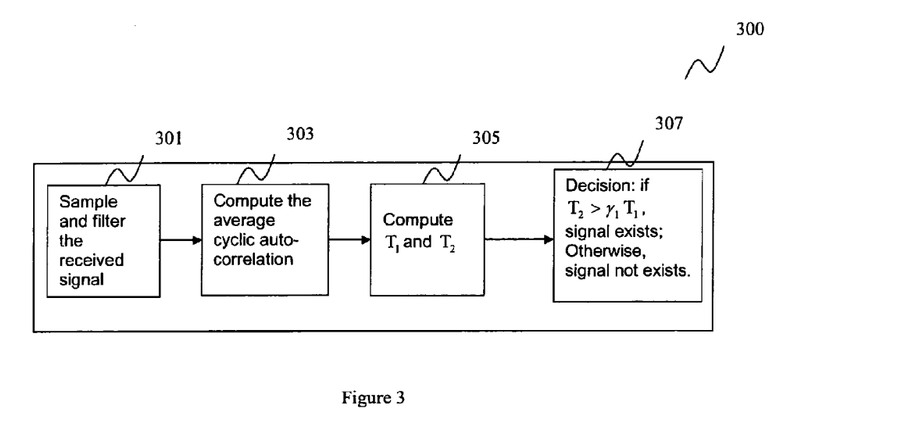
FIG. 3 shows a flow diagram illustrating how a first method of determining as to whether a received signal includes a data signal may be performed according to one embodiment of the invention.

FIG. 3 shows a flow diagram 300 illustrating how a first method of determining as to whether a received signal includes a data signal may be performed according to one embodiment of the invention.

Before discussing the first method of determining as to whether a received signal includes a data signal, terms and equations which may be used in the context of the said first method may be described as follows.

Let y(t) represent the continuous time received signal.

In this context, two hypotheses may be made. In the first hypothesis $H_0$, the received signal may contain only noise. In the second hypothesis $H_1$, the received signal may contain a data signal as well as noise.

The received signal samples under the two hypotheses may be respectively given by $$H_0: y(t) = w(t) \tag{1}$$

$$H_1: y(t) = x(t) + w(t), \tag{2}$$

where x(t) is a possible data signal component (including fading, multipath effect and filtering effects), and w(t) is the noise (including filtering effects).

The respective cyclic auto-correlation of the received signal, the transmitted signal and noise may be written as follows $$R_y(\tau, \alpha) = \lim_{T \to \infty} \int_{-T/2}^{T/2} y(t+\tau/2) y^*(t-\tau/2) e^{-j2\pi\alpha t} dt \tag{3}$$

$$R_x(\tau, \alpha) = \lim_{T \to \infty} \int_{-T/2}^{T/2} x(t+\tau/2) x^*(t-\tau/2) e^{-j2\pi\alpha t} dt \tag{4}$$

$$R_w(\tau, \alpha) = \lim_{T \to \infty} \int_{-T/2}^{T/2} w(t+\tau/2) w^*(t-\tau/2) e^{-j2\pi\alpha t} dt \tag{5}$$

It is known (cf. for example [1]) that $$R_y(\tau,\alpha) = R_x(\tau,\alpha) + R_w(\tau,\alpha) \tag{6}$$

and $$R_w(\tau,\alpha) = 0, \alpha \neq 0. \tag{7}$$

In practice, the respective cyclic auto-correlation may be averaged over multiple time slots. As such, the respective average values of the cyclic auto-correlation at the cyclic frequency α may be expressed as $$C_y(\alpha) = \int |R_y(\tau,\alpha)| d\tau \tag{8}$$

$$C_x(\alpha) = \int |R_x(\tau,\alpha)| d\tau \tag{9}$$

$$C_w(\alpha) = \int |R_w(\tau,\alpha)| d\tau \tag{10}$$

Accordingly, Equations (6) and (7) may be rewritten as follows.

If the received signal includes a data signal, there exists some α≠0 such that $$C_y(\alpha) = C_x(\alpha) \neq 0 \tag{11}$$

and if the received signal does not include a data signal, $$C_y(\alpha) = C_w(\alpha) = 0, \alpha \neq 0 \tag{12}$$

Let Ω represent the set of cyclic frequencies of the signal x(t) (including the cyclic frequency 0).

A first value $T_1$ and a second value $T_2$ may be defined as $$T_1 = C_y(0) \tag{13}$$

$$T_2 = \sum_{\alpha \in \Omega} C_y(\alpha) \tag{14}$$

If the received signal does not include a data signal, then $C_y(\alpha)=0$, $\alpha \neq 0$. As such, $T_2=T_1$ (from Equations (13) and (14)). In other words, if the received signal does not include a data signal, the ratio $T_2/T_1=1$.

Similarly, it can be seen that if the received signal includes a data signal, then $T_2/T_1 > 1$. As such, the ratio $T_2/T_1$ may be used to determine as to whether a received signal includes a data signal.

For the case where only a limited number of samples may be obtained for the received signal, we may define a predetermined factory $\gamma_1$, which may be related to the number of samples but not related to noise power. For example, the predetermined factor $\gamma_1$ may be defined such that $P(T_2 > \gamma_1 T_1) = P_0$, where $P_0$ is the desired probability of false alarm (or false detection) when the received signal does not include a data signal, and $P(x)$ is the probability of the event x happening.

According to a preferred implementation of one embodiment of the invention, the first method of determining as to whether a received signal includes a data signal, which may be based on a time domain averaged cyclo-stationary detection (TDACD) algorithm, may be implemented as shown in FIG. 3.

In step 301, the received signal may be sampled and filtered.

Next, in step 303, the averaged cyclic auto-correlation $C_y(\alpha)$, $\alpha \in \Omega$ may be calculated from the sampled received signal.

Following which, in step 305, the first value $T_1$ and the second value $T_2$ may be calculated from the averaged cyclic auto-correlation $C_y(\alpha)$, $\alpha \in \Omega$, for example, as defined in Equations (13) and (14) respectively.

Finally, in step 307, the ratio of $T_2/T_1$ may be used to determine as to whether a received signal includes a data signal. Further, in step 307, if it is determined that the ratio of $T_2/T_1 > \gamma_1$, then it may be concluded that the received signal includes a data signal; otherwise, it may be concluded that the received signal does not include a data signal. As mentioned earlier, $\gamma_1$ may be a predetermined factor selected to be the probability of false alarm (or false detection) when the received signal does not include a data signal, for example.

Figure 4:
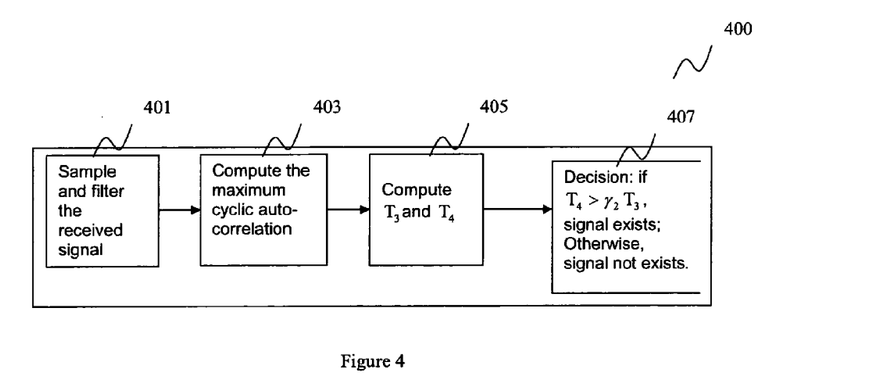
FIG. 4 shows a flow diagram illustrating how a second method of determining as to whether a received signal includes a data signal may be performed according to one embodiment of the invention.

FIG. 4 shows a flow diagram 400 illustrating how a second method of determining as to whether a received signal includes a data signal may be performed according to one embodiment of the invention.

When compared with the first method of determining as to whether a received signal includes a data signal discussed earlier in relation to FIG. 3, it can be seen that the second method of determining as to whether a received signal includes a data signal, may be based on a time domain maximum cyclo-stationary detection (TDMCD) algorithm, instead of on the time domain averaged cyclo-stationary detection (TDACD) algorithm (used in the said first method).

Before discussing the second method of determining as to whether a received signal includes a data signal, terms and equations which may be used in the context of the said second method may be described as follows.

In this context, let the maximum cyclic auto-correlation of the received signal at the cyclic frequency α be written as $$D_y(\alpha) = \max_\tau |R_y(\tau, \alpha)| \tag{15}$$

Next, a first value $T_3$ and a second value $T_4$ may be defined as $$T_3 = D_y(0) \tag{16}$$

$$T_4 = \sum_{\alpha \in \Omega} D_y(\alpha) \tag{17}$$

Likewise, it can be seen from Equations (16) and (17) that if the received signal does not include a data signal, then $T_4/T_3 = 1$. Further, it can also be seen that if the received signal includes a data signal, then $T_4/T_3 > 1$. As such, the ratio $T_4/T_3$ may be used to determine as to whether a received signal includes a data signal.

According to a preferred implementation of one embodiment of the invention, the second method of determining as to whether a received signal includes a data signal, which may be based on the time domain maximum cyclo-stationary detection (TDMCD) algorithm, may be implemented as shown in FIG. 4.

In step 401, the received signal may be sampled and filtered. This step is the same as step 301 in the first method of determining as to whether a received signal includes a data signal discussed earlier in relation to FIG. 3.

Next, in step 403, the maximum cyclic auto-correlation $D_y(\alpha)$, $\alpha \in \Omega$ may be calculated from the sampled received signal.

Following which, in step 405, the first value $T_3$ and the second value $T_4$ may be calculated from the maximum cyclic auto-correlation $D_y(\alpha)$, $\alpha \in \Omega$, for example, as defined in Equations (16) and (17) respectively.

Finally, in step 407, the ratio of $T_4/T_3$ may be used to determine as to whether a received signal includes a data signal. Further, in step 407, if it is determined that the ratio of $T_4/T_3 > \gamma_2$, then it may be concluded that the received signal includes a data signal; otherwise, it may be concluded that the received signal does not include a data signal. As mentioned earlier, $\gamma_2$ may be a predetermined factor selected to be the probability of false alarm (or false detection) when the received signal does not include a data signal, for example.

Figure 5:
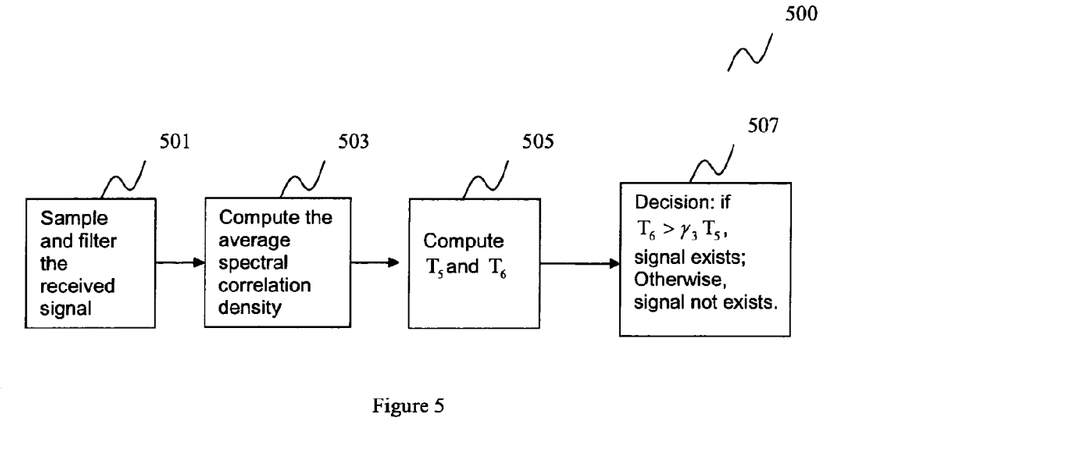
FIG. 5 shows a flow diagram illustrating how a third method of determining as to whether a received signal includes a data signal may be performed according to one embodiment of the invention.

FIG. 5 shows a flow diagram 500 illustrating how a third method of determining as to whether a received signal includes a data signal may be performed according to one embodiment of the invention.

When compared with the first method of determining as to whether a received signal includes a data signal discussed earlier in relation to FIG. 3, it can be seen that the third method of determining as to whether a received signal includes a data signal may be based on a frequency domain averaged spectral correlation density (FDASCD) algorithm, instead of on the time domain averaged cyclo-stationary detection (TDACD) algorithm (used in the said first method).

Before discussing the third method of determining as to whether a received signal includes a data signal, terms and equations which may be used in the context of the said third method may be described as follows.

Let the respective spectral correlation density (SCD) functions of the received signal, the transmitted signal and noise be written as $$S_y(f,\alpha) = \int_{-\infty}^{+\infty} R_y(\tau,\alpha) e^{-j2\pi f \tau} d\tau \tag{18}$$

$$S_x(f,\alpha) = \int_{-\infty}^{+\infty} R_x(\tau,\alpha) e^{-j2\pi f \tau} d\tau \tag{19}$$

$$S_w(f,\alpha) = \int_{-\infty}^{+\infty} R_w(\tau,\alpha) e^{-j2\pi f \tau} d\tau \tag{20}$$

Similar to Equations (6) and (7), it is known (cf. for example [1]) that $$S_y(f,\alpha) = S_x(f,\alpha) + S_w(f,\alpha) \tag{21}$$

and $$S_w(f,\alpha) = 0, \alpha \neq 0. \tag{22}$$

The respective average values of the spectral correlation density at the cyclic frequency α may be expressed as $$E_y(\alpha) = \int |S_y(f, \alpha)| df \quad (23)$$

$$E_x(\alpha) = \int |S_x(f, \alpha)| df \quad (24)$$

$$E_w(\alpha) = \int |S_w(f, \alpha)| df \quad (25)$$

Accordingly, Equations (21) and (22) may also be rewritten as follows.

If the received signal includes a data signal, there exists some α≠0 such that $$E_y(\alpha) = E_x(\alpha) \neq 0, \quad (26)$$

and if the received signal does not include a data signal, $$E_y(\alpha) = E_w(\alpha) = 0, \alpha \neq 0. \quad (27)$$

Next, a first value $T_5$ and a second value $T_6$ may be defined as $$T_5 = E_y(0) \quad (28)$$

$$T_6 = \sum_{\alpha \in \Omega} E_y(\alpha) \quad (29)$$

Likewise, it can be seen from Equations (16) and (17) that if the received signal does not include a data signal, then $T_6/T_5 = 1$. Further, it can also be seen that if the received signal includes a data signal, then $T_6/T_5 > 1$. As such, the ratio $T_6/T_5$ may be used to determine as to whether a received signal includes a data signal.

According to a preferred implementation of one embodiment of the invention, the third method of determining as to whether a received signal includes a data signal, which may be based on the frequency domain averaged spectral correlation density (FDASCD) algorithm, may be implemented as shown in FIG. 5.

In step 501, the received signal may be sampled and filtered. This step is the same as step 301 in the first method of determining as to whether a received signal includes a data signal discussed earlier in relation to FIG. 3.

Next, in step 503, the spectral correlation density $E_y(\alpha)$, α∈Ω may be calculated from the sampled received signal.

Following which, in step 505, the first value $T_5$ and the second value $T_6$ may be calculated from the averaged spectral correlation density $E_y(\alpha)$, α∈Ω, for example, as defined in Equations (28) and (29) respectively.

Finally, in step 507, the ratio of $T_6/T_5$ may be used to determine as to whether a received signal includes a data signal. Further, in step 507, if it is determined that the ratio of $T_6/T_5 > \gamma_3$, then it may be concluded that the received signal includes a data signal; otherwise, it may be concluded that the received signal does not include a data signal. As mentioned earlier, $\gamma_3$ may be a predetermined factor selected to be the probability of false alarm (or false detection) when the received signal does not include a data signal, for example.

Figure 6:
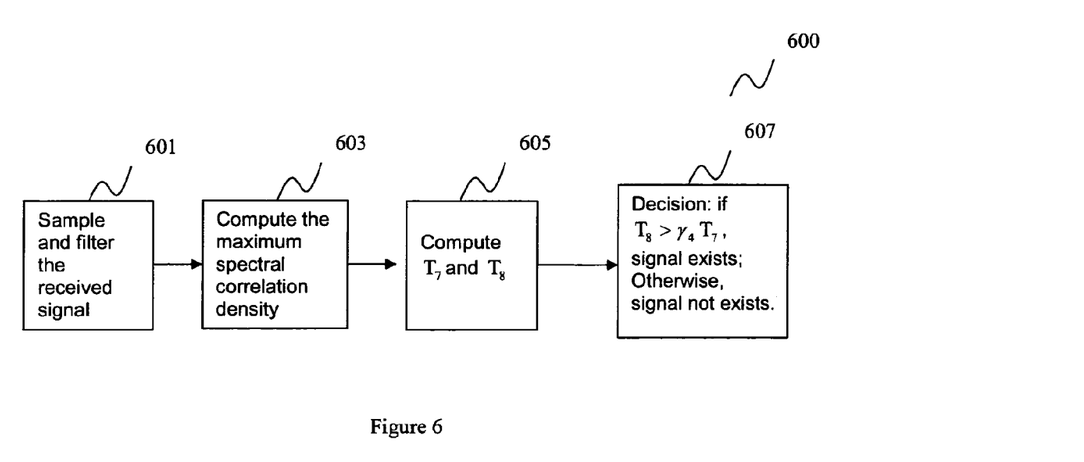
FIG. 6 shows a flow diagram illustrating how a fourth method of determining as to whether a received signal includes a data signal may be performed according to one embodiment of the invention.

FIG. 6 shows a flow diagram 600 illustrating how a fourth method of determining as to whether a received signal includes a data signal may be performed according to one embodiment of the invention.

When compared with the third method of determining as to whether a received signal includes a data signal discussed earlier in relation to FIG. 5, it can be seen that the fourth method of determining as to whether a received signal includes a data signal may be based on a frequency domain maximum spectral correlation density (FDMSCD) algorithm, instead of on the frequency domain averaged spectral correlation density (FDASCD) algorithm (used in the said third method).

Before discussing the fourth method of determining as to whether a received signal includes a data signal, terms and equations which may be used in the context of the said fourth method may be described as follows.

In this context, let the maximum spectral correlation density (SCD) of the received signal at the cyclic frequency α be written as $$F_y(\alpha) = \max_f |S_y(f, \alpha)| \quad (30)$$

Next, a first value and a second value may be defined as $$T_7 = F_y(0) \quad (31)$$

$$T_8 = \sum_{\alpha \in \Omega} F_y(\alpha) \quad (32)$$

Likewise, it can be seen from Equations (31) and (32) that if the received signal does not include a data signal, then $T_8/T_7 = 1$. Further, it can also be seen that if the received signal includes a data signal, then $T_8/T_7 > 1$. As such, the ratio $T_8/T_7$ may be used to determine as to whether a received signal includes a data signal.

According to a preferred implementation of one embodiment of the invention, the third method of determining as to whether a received signal includes a data signal, which may be based on the frequency domain maximum spectral correlation density (FDMSCD) algorithm, may be implemented as shown in FIG. 6.

In step 601, the received signal may be sampled and filtered. This step is the same as step 301 in the first method of determining as to whether a received signal includes a data signal discussed earlier in relation to FIG. 3.

Next, in step 603, the maximum spectral correlation density $F_y(\alpha)$, α∈Ω may be calculated from the sampled received signal.

Following which, in step 605, the first value $T_7$ and the second value $T_8$ may be calculated from the maximum spectral correlation density $F_y(\alpha)$, α∈Ω, for example, as defined in Equations (28) and (29) respectively.

Finally, in step 607, the ratio of $T_8/T_7$ may be used to determine as to whether a received signal includes a data signal. Further, in step 607, if it is determined that the ratio of $T_8/T_7 > \gamma_4$, then it may be concluded that the received signal includes a data signal; otherwise, it may be concluded that the received signal does not include a data signal. As mentioned earlier, $\gamma_4$ may be a predetermined factor selected to be the probability of false alarm (or false detection) when the received signal does not include a data signal, for example.

Figure 7:
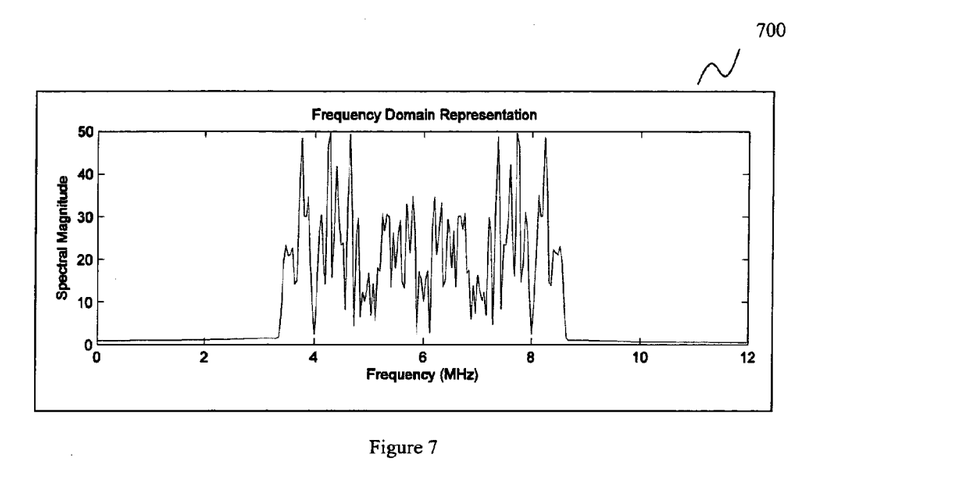
FIG. 7 shows the frequency domain representation of the data signal used in the simulations carried out according to one embodiment of the invention.

FIG. 7 shows the frequency domain representation of the data signal used in the simulations carried out according to one embodiment of the invention.

In the simulations carried out, the data signal is an amplitude modulated signal with a carrier frequency of 6 MHz and a bandwidth which spans from 3.5 MHz to 8.5 MHz, as shown in FIG. 5.

The simulation results are averaged over 100 random Monte-Carlo realizations for each signal to noise ratio (SNR) value. In this context, each random Monte-Carlo realization is carried out using a random amplitude modulated signal. Further, the sampling rate used is 24 MHz and 400 000 samples are used in each realization.

Additionally, it should be noted that the number of Monte-Carlo realizations required may be increased by an order of magnitude, when the predetermined factor is determining for each simulation scenario, for example.

Further, since the respective methods implemented in the time domain and in the frequency domain are similar, only the simulation results for the methods implemented in the frequency domain are shown. In more detail, FIG. 8 shows the simulation results for the third method of determining as to whether a received signal includes a data signal (discussed in relation to FIG. 5) and FIG. 9 shows the simulation results for the fourth method of determining as to whether a received signal includes a data signal (discussed in relation to FIG. 6).

Additionally, it should be noted that the probability of false alarm (Pfa) for the simulation scenarios has been set to 0.1.

Figure 8:
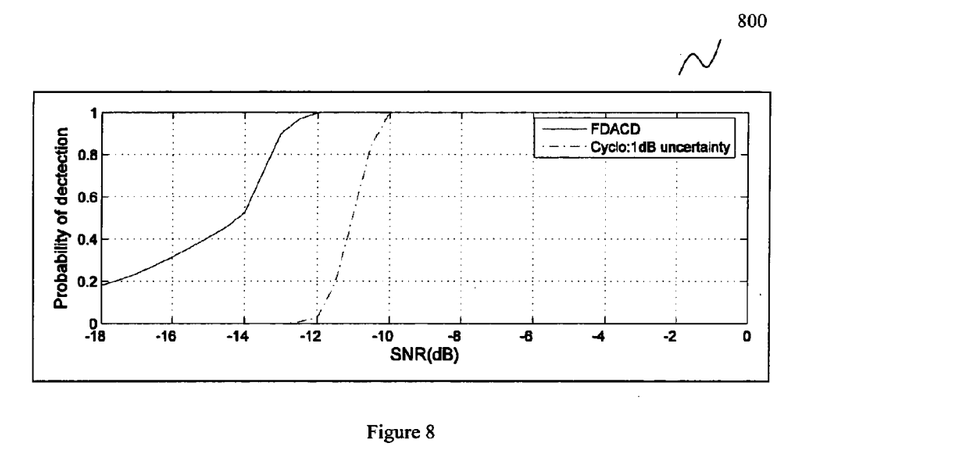
FIG. 8 shows a first graph comparing the performance results of one embodiment of the invention against a conventional cyclo-stationary based detection method.
Figure 9:
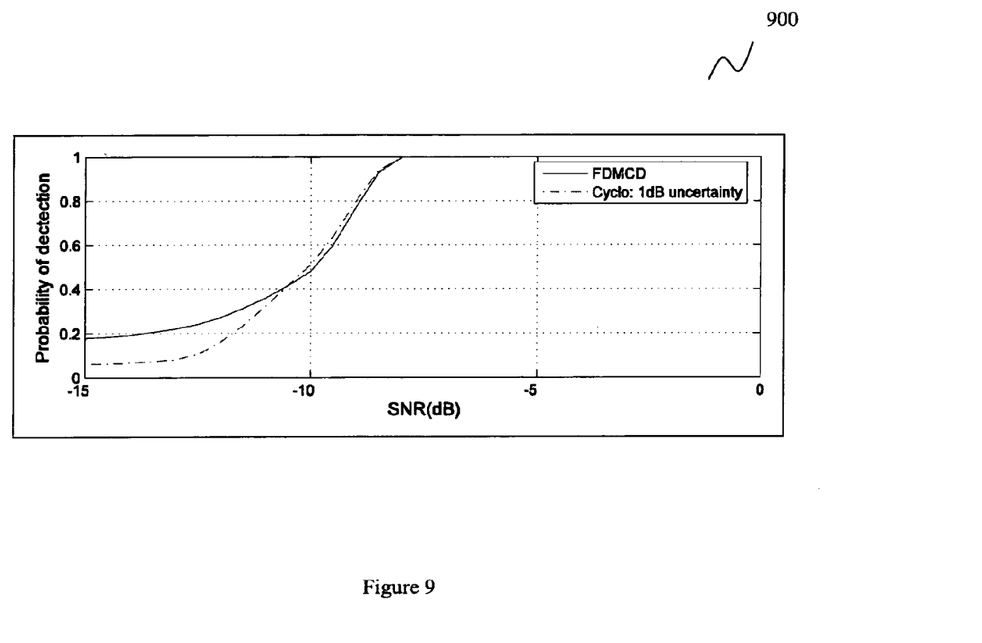
FIG. 9 shows a second graph comparing the performance results of one embodiment of the invention against a conventional cyclo-stationary based detection method.

FIG. 8 shows a first graph 800 comparing the performance results of one embodiment of the invention against a conventional cyclo-stationary based detection method.

The first graph 800 shows the performance results measured by the probability of detection (on the y-axis) versus the signal to noise ratio (SNR) (on the x-axis). In this case, the data signal shown in FIG. 7 may be used in the simulations to generate the performance results. In more detail, the embodiment of the invention used to obtain the performance results shown in the first graph 800 is the third method of determining as to whether a received signal includes a data signal.

As shown in the first graph 800, in order to achieve a probability of detection of 0.8, the performance of the third method of determining as to whether a received signal includes a data signal shows more than 2 dB improvement over that of the conventional cyclo-stationary based detection method.

FIG. 9 shows a second graph 900 comparing the performance results of another embodiment of the invention against a conventional cyclo-stationary based detection method.

Like the first graph 800, the second graph 900 also shows the performance results measured by the probability of detection (on the y-axis) versus the signal to noise ratio (SNR) (on the x-axis). The data signal shown in FIG. 7 may also be used in the simulations to generate the performance results. In more detail, the embodiment of the invention used to obtain the performance results shown in the second graph 900 is the fourth method of determining as to whether a received signal includes a data signal.

As shown in the second graph 900, in order to achieve a probability of detection of 0.8, the performance of the fourth method of determining as to whether a received signal includes a data signal is about the same as that of the conventional cyclo-stationary based detection method. However, in order to achieve a probability of detection of 0.2, the performance of the fourth method of determining as to whether a received signal includes a data signal shows more than 1 dB improvement over that of the conventional cyclo-stationary based detection method.

Additionally, besides the performance improvements which may be obtained as discussed earlier in relation to FIGS. 8 and 9, embodiments of the invention also have another advantage in that they do not need to estimate noise power. This advantage may result in a lower complexity in terms of implementation as well.

Further, as shown in FIGS. 8 and 9, embodiments of the invention may also be used for the detection of a data signal at a very low signal to noise ratio (SNR) environment.

Embodiments of the invention may be used in most communication systems, including detectors, receivers or sensing devices or customer premise equipment (CPE), operating in cognitive radio (e.g., IEEE 802.22), sensor networks, and any wired or wireless communication system, for example. Embodiments of the invention may also be used for sensing (or detecting a data signal) in an environment where there is no knowledge of the channel and/or noise power.

Embodiments of the invention have the following effect.

When compared to the conventional cyclo-stationary based detection methods, embodiments of the invention provide the following advantages, namely: (i) they do not require the knowledge of the noise power in order to set the respective threshold values, and (ii) they do not face the problem of noise uncertainty.

The first above discussed advantage allows the respective implementations of the embodiments of the invention to be further simplified. Additionally, the second above discussed advantage makes embodiments of the invention robust, especially in a changing environment. Further, embodiments of the invention may be used for various signal detection applications, where the knowledge of the channel and/or noise power is not available.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

In this document, the following publication is cited:

[1] W. A. Gardner, "Exploitation of spectral redundancy in cyclostationary signals," IEEE Signal Processing Mag., vol. 8, pp. 14-36, April 1991.

What is claimed is:

1. A method of determining as to whether a received signal includes a data signal, the method comprising
    determining a first value based on a cyclic auto-correlation of the received signal,
    determining a second value based on the cyclic auto-correlation of the received signal, and
    determining as to whether a received signal includes a data signal based on a comparison of the first value and the second value,
        wherein it is determined that the received signal includes a data signal if the second value is larger than the first value multiplied with a predetermined factor.

2. The method of claim 1,
    wherein it is determined that the received signal does not include a data signal if the second value is smaller than or equal to the first value multiplied with the predetermined factor.

3. The method of claim 1, further comprising
    filtering the received signal.

4. The method of claim 1, further comprising
    sampling the received signal.

5. The method of claim 4, further comprising
    filtering the sampled received signal.

6. The method of claim 1,
    wherein the predetermined factor is determined based on a predetermined number of samples of the received signal.

7. The method of claim 1,
    wherein the predetermined factor is determined based on a predetermined probability of false alarm.

8. The method of claim 7,
wherein the predetermined factor is determined based on the determination of the probability of the second value being greater than the first value multiplied with the predetermined factor in the case that the received signal does not include a data signal as the probability of false alarm.

9. The method of claim 1,
wherein the first value comprises the cyclic auto-correlation value corresponding to the cyclic frequency of zero.

10. The method of claim 9,
wherein the first value is the cyclic auto-correlation value corresponding to the cyclic frequency of zero.

11. The method of claim 1,
wherein the second value comprises the cyclic auto-correlation values corresponding to a plurality of predetermined cyclic frequencies.

12. The method of claim 11,
wherein the second value is given by the sum of the cyclic autocorrelation values corresponding to the cyclic frequencies of the plurality of predetermined cyclic frequencies.

13. The method of claim 1,
wherein the determining of the first value and the second value comprises determining an average value of a cyclic auto-correlation of the received signal.

14. The method of claim 1,
wherein the determining of the first value and the second value comprises determining a maximum value of the cyclic auto-correlation of the received signal.

15. The method of claim 1,
wherein the determining of the first value and the second value comprises determining an average value of a spectral correlation density of the received signal.

16. The method of claim 1,
wherein the determining of the first value and the second value comprises determining a maximum value of the spectral correlation density of the received signal.

17. A system for determining as to whether a received signal includes a data signal, comprising
a first determining unit configured to determine a first value based on a cyclic auto-correlation of the received signal,
a second determining unit configured to determine a second value based on the cyclic auto-correlation of the received signal, and
a third determining unit configured to determine as to whether a received signal includes a data signal based on a comparison of the first value and the second value,
wherein the third determining unit is configured to determine that the received signal includes a data signal if the second value is larger than the first value multiplied with a predetermined factor.

18. The system of claim 17, further comprising
a filter for filtering the received signal.

19. The system of claim 17, further comprising
a sampling unit for sampling the received signal.

20. The system of claim 19, further comprising
a filter for filtering the sampled received signal.

21. An electronic device comprising the system of any of the claims 17 to 20.

22. The electronic device of claim 21,
wherein the electronic device is a sensing wireless device.

23. The electronic device of claim 21,
wherein the electronic device is a sensing wireless microphone.

24. The electronic device of claim 21,
being configured as a communication device selected from a group of communication devices consisting of
a communication terminal;
a medium player device configured to play at least one medium.

25. The electronic device of claim 21, further comprising a receiver to receive a signal.

26. A computer program product which, when being executed by a computer, makes the computer perform a method for determining as to whether a received signal includes an information signal, comprising
determining a first value based on a cyclic auto-correlation of the received signal,
determining a second value based on the cyclic auto-correlation of the received signal, and
determining as to whether a received signal includes a data signal based on a comparison of the first value and the second value,
wherein it is determined that the received signal includes a data signal if the second value is larger than the first value multiplied with a predetermined factor.

* * * * *